United States Patent
Hertzberg

(10) Patent No.: US 11,411,225 B2
(45) Date of Patent: Aug. 9, 2022

(54) CHAMBERED FRAME INSERT

(71) Applicant: EOS Energy Storage, LLC, Edison, NJ (US)

(72) Inventor: Benjamin Hertzberg, Burbank, CA (US)

(73) Assignee: EOS Energy Storage LLC, Edison, NJ (US)

( * ) Notice: Subject to any disclaimer, the term of this patent is extended or adjusted under 35 U.S.C. 154(b) by 0 days.

(21) Appl. No.: 16/648,988

(22) PCT Filed: Sep. 25, 2018

(86) PCT No.: PCT/US2018/052549
§ 371 (c)(1),
(2) Date: Mar. 19, 2020

(87) PCT Pub. No.: WO2019/067392
PCT Pub. Date: Apr. 4, 2019

(65) Prior Publication Data
US 2020/0251745 A1     Aug. 6, 2020

Related U.S. Application Data

(60) Provisional application No. 62/563,173, filed on Sep. 26, 2017.

(51) Int. Cl.
*H01M 4/73* (2006.01)
*H01M 10/04* (2006.01)
(Continued)

(52) U.S. Cl.
CPC ......... *H01M 4/73* (2013.01); *H01M 10/0418* (2013.01); *H01M 10/365* (2013.01); *H01M 50/463* (2021.01); *H01M 2300/0002* (2013.01)

(58) Field of Classification Search
CPC ... H01M 10/04; H01M 10/0413–0418; H01M 10/36–365; H01M 4/70–73; H01M 50/40–497
See application file for complete search history.

(56) References Cited

U.S. PATENT DOCUMENTS 2,198,845 A * 4/1940 Smithers ............. H01M 50/463
429/146
2,591,754 A * 4/1952 Wilson .............. H01M 50/4295
429/253
(Continued)

FOREIGN PATENT DOCUMENTS

WO      2016057477 A1    4/2016

OTHER PUBLICATIONS

International Search Report issued in corresponding PCT application No. PCT/US2018/052549 dated Nov. 30, 2018.
(Continued)

*Primary Examiner* — Jonathan Crepeau
*Assistant Examiner* — Jacob Buchanan
(74) *Attorney, Agent, or Firm* — Botos Churchill IP Law LLP

(57) ABSTRACT

A chambered frame insert (2) for an electrolyte chamber of a battery (200) includes a plurality of ribs (4) laterally and defining a plurality of chambers (6), and a plurality of voids (8) each formed in a corresponding rib and configured to allow gas to travel between the plurality of chambers. The plurality of ribs are angled with respect to a horizontal lateral axis (H) of the frame insert.

21 Claims, 5 Drawing Sheets

(51) Int. Cl.
*H01M 10/36* (2010.01)
*H01M 50/463* (2021.01)

(56) References Cited

U.S. PATENT DOCUMENTS

| | | | | |
|---|---|---|---|---|
| 4,218,521 A | * | 8/1980 | Putt | H01M 10/365 429/70 |
| 4,396,689 A | * | 8/1983 | Grimes | H01M 50/463 429/105 |
| 4,403,024 A | * | 9/1983 | Gordon | H01M 50/463 264/41 |
| 4,555,459 A | | 11/1985 | Anderson et al. | |
| 4,619,875 A | | 10/1986 | Stahura et al. | |
| 5,240,468 A | * | 8/1993 | Willmann | H01M 50/44 29/623.5 |
| 5,250,372 A | * | 10/1993 | Willmann | H01M 50/44 429/146 |
| 5,308,718 A | | 5/1994 | Eidler et al. | |
| 5,591,538 A | | 1/1997 | Eidler et al. | |
| 5,601,953 A | | 2/1997 | Schenk | |
| 5,985,484 A | * | 11/1999 | Young | H01M 50/463 429/143 |
| 6,376,126 B1 | * | 4/2002 | Faust | H01M 50/112 429/176 |
| 2013/0065121 A1 | | 3/2013 | Harker et al. | |
| 2014/0356727 A1 | | 12/2014 | Nouzuka et al. | |
| 2017/0194666 A1 | | 7/2017 | Krishnaswamy et al. | |

OTHER PUBLICATIONS

U.S. PCT application No. PCT/US2017/033028 filed May 17, 2017.
U.S. Appl. No. 62/427,983, filed Nov. 30, 2016.
U.S. Appl. No. 62/549,667, filed Aug. 24, 2017.

* cited by examiner

CHAMBERED FRAME INSERT

CROSS REFERENCE TO RELATED APPLICATIONS

The present application is a national phase entry under 35 U.S.C. § 371 of International Application No. PCT/US2018/052549, filed Sep. 25, 2018, which claims the benefit of U.S. provisional patent application No. 62/563,173, filed on Sep. 26, 2017, the disclosures of which are hereby incorporated herein by reference.

FIELD OF THE INVENTION

The present invention relates to a chambered frame insert for a static, zinc-halogen rechargeable battery.

BACKGROUND

This section provides background information related to the present disclosure and is not necessarily prior art.

Stratification is a known problem in lead-acid batteries where the acid (i.e., sulfuric acid) has a higher density than water, which causes the acid formed at the plates during charging to flow downward and collect at the bottom of a battery. Eventually the mixture will again reach uniform composition by diffusion, but this is a very slow process. Repeated cycles of partial charging will increase stratification of the electrolyte, reducing the capacity and performance of the battery because the lack of acid at the top of the battery limits plate activation. Compartmentalized cell designs have been used in the past in order to counteract stratification in lead-acid batteries. See, for example, U.S. Pat. No. 4,619,875.

Stratification has never been understood to be a problem in other types of batteries. Specifically, aqueous batteries using a dissolved salt as a combined anolyte/catholyte, such as zinc-bromine or other zinc-halogen technologies, were not understood to suffer performance loss or other problems due to stratification.

There is a need for improvement of batteries, such as zinc-halide batteries, including improving the performance of the batteries.

SUMMARY

This section provides a general summary of the disclosure, and is not a comprehensive disclosure of its full scope or all of its features.

The inventor has surprisingly discovered that aqueous batteries using a dissolved salt as a combined anolyte/catholyte, such as zinc-bromine or other zinc-halide technologies, suffer from performance loss due to stratification. Indeed, the inventor has surprisingly discovered that by implementing a frame insert according to the present invention, performance of zinc-halide batteries can be significantly improved. The inventor has further discovered that stratification occurs in aqueous batteries using a dissolved salt when, after multiple cycles, the amount of dissolved salt in the electrolyte becomes non-uniform as a function of cell height. These salt distribution changes cause the electrolyte to separate into a less dense layer (top) and a more dense layer (bottom). This effect is particularly severe in taller, narrower cell formats.

Accordingly, one aspect of the disclosure provides a frame insert for an electrolyte chamber of a battery. The frame insert has a plurality of ribs extending laterally and defining a plurality of chambers. The plurality of ribs are angled (i.e., slanted) with respect to a horizontal lateral axis of the frame insert. A plurality of voids are defined in the plurality of ribs that allow gas to travel between the plurality of chambers. By dividing an open primary electrolyte chamber into a plurality of chambers with smaller height, the frame insert changes convection pathways within the cell, improving resistance to stratification. The slanted orientation of the ribs defining the chambers also improves convection.

Implementations of the disclosure may include one or more of the following optional features. In some embodiments, the plurality of voids are a plurality of slots. In some embodiments, the plurality of voids are laterally staggered across the plurality of ribs. In some embodiments, the plurality of voids are defined in a longitudinal face of the ribs. In some embodiments, the plurality of voids are near or adjacent to the upward most lateral ends of the plurality of ribs. The voids, such as a staggered series of small slots formed in the anode side of the ribs, allow evolved gas to escape.

In some embodiments, the frame insert further includes an outer member surrounding the plurality of ribs and joined to the plurality of ribs at a lateral end of the plurality of ribs. In some embodiments, the frame insert further includes a central member extending in a lateral vertical direction within the outer member and joined to the outer member. In some embodiments, a majority of the plurality of ribs extend from the central member to the outer member. In some embodiments, the outer member laterally surrounds the plurality of ribs and is joined to the plurality of ribs at an outer lateral end of the ribs and the central member extends from a first position of the outer member to a second position of the outer member and the central member is joined to a majority of the plurality of ribs at an inner lateral end of the ribs. In some embodiments, the joints between the plurality of ribs and the outer member and the joints between the plurality of ribs and the central member are rounded, such that the plurality of chambers defined by the plurality of ribs, outer member, and central member have rounded corners. In some embodiments, a majority of the plurality of chambers defined by the plurality of ribs, outer member, and central member are substantially parallelogrammatic or trapezoidal.

In some embodiments, the plurality of ribs extend at an angle above the horizontal lateral axis from the central member to the outer member. In some embodiments, a majority of the plurality of chambers have consistent height across their length. In some embodiments, a majority of the plurality of chambers are of the same height as one another.

Another aspect of the disclosure provides a battery (i.e., a rechargeable battery) having an anode, a cathode, an aqueous dissolved salt electrolyte, a frame, and a frame insert. The frame insert includes a plurality of ribs extending laterally and defining a plurality of chambers, where the plurality of ribs are angled with respect to a horizontal lateral axis of the frame insert. The electrolyte at least partially fills a plurality of chambers of the frame insert.

This aspect may include one or more of the following optional features. In some embodiments, the aqueous dissolved salt electrolyte is a zinc-halide electrolyte. In some embodiments, the frame insert is laterally supported by the frame. In some embodiments, the frame insert is longitudinally supported by one or more of the cathode, the anode and the frame.

In some embodiments, the frame insert of the batter further includes a plurality of voids defined in the plurality of ribs that allow gas to travel between the plurality of chambers. In some embodiments, the plurality of voids are defined in a front face of the plurality of ribs, and the front face is adjacent to the anode. In some embodiments, the electrolyte fully fills the plurality of chambers except for a head space at the uppermost chamber(s).

The details of one or more implementations of the disclosure are set forth in the accompanying drawings and the description below. Other aspects, features, and advantages will be apparent from the description and drawings, and from the claims.

DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
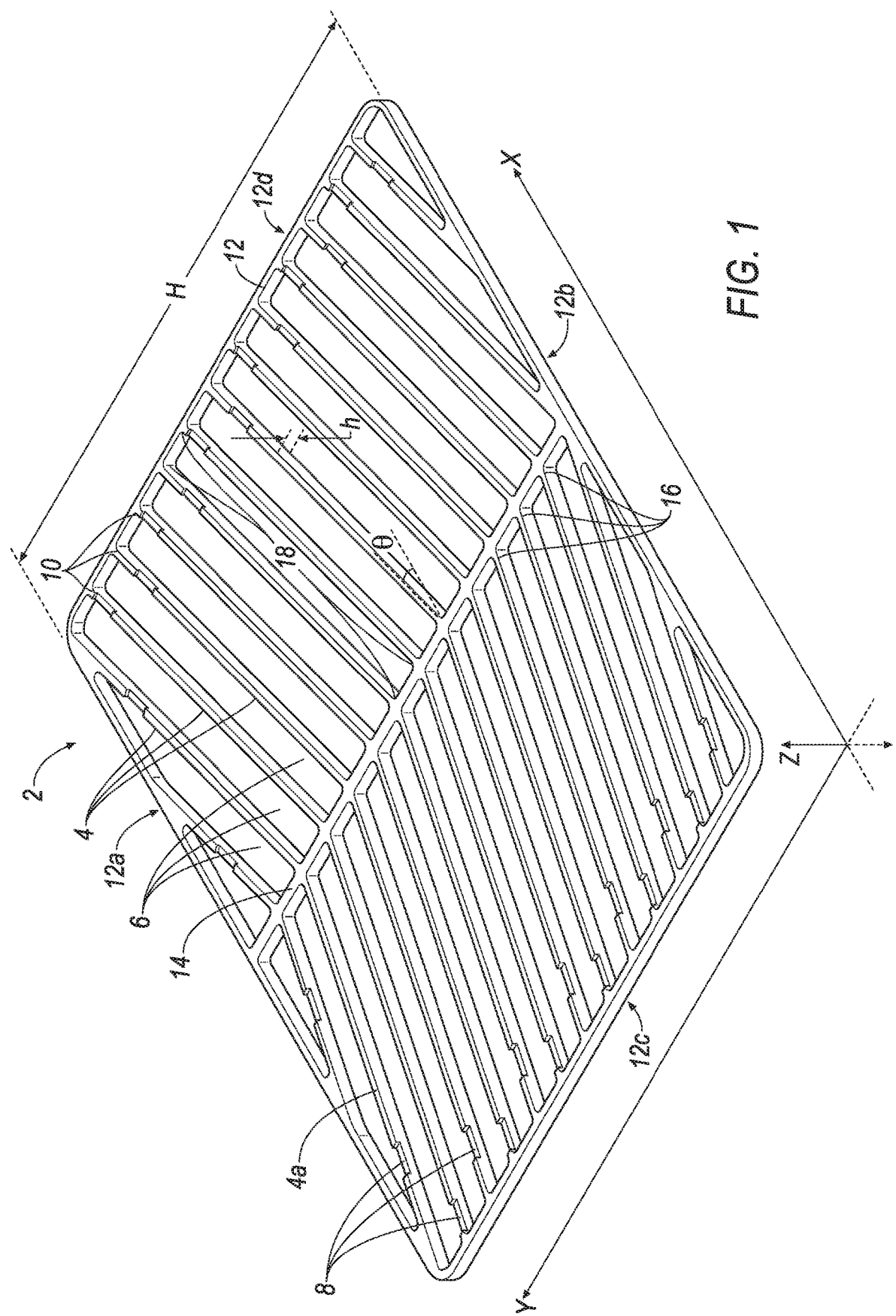
FIG. 1 is a perspective view of a frame insert.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

I. Definitions

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "joined to," or "coupled to" another element or layer, it may be directly on, engaged, connected, joined, or coupled to the other element or layer, or intervening elements or layers may be present. In contrast, when an element is referred to as being "directly on," "directly engaged to," "directly connected to," "directly joined to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The terms, upper, lower, above, beneath, right, left, etc. may be used herein to describe the position of various elements with relation to other elements. These terms represent the position of elements in an example configuration. However, it will be apparent to one skilled in the art that the frame assembly may be rotated in space without departing from the present disclosure and thus, these terms should not be used to limit the scope of the present disclosure.

As used herein, the term "static" refers to batteries that comprise a liquid electrolyte, wherein the liquid electrolyte is not circulated (via a pump or the like) from a reservoir to the site of electrochemical activity (e.g., oxidation and/or reduction of a battery electrode).

As used herein, the term "battery" encompasses electrical storage devices comprising at least one electrochemical cell. A "secondary battery" or simply a "rechargeable battery" is rechargeable, whereas a "primary battery" is not rechargeable. For secondary batteries of the present invention, a battery anode is designated as the positive electrode during discharge, and as the negative electrode during charge.

As used herein, the term "electrochemical cell" or "cell" are used interchangeably to refer to a device capable of either generating electrical energy from chemical reactions or facilitating chemical reactions through the introduction of electrical energy.

As used herein, an "electrolyte" refers to a substance that behaves as an ionically conductive medium. For example, the electrolyte facilitates the mobilization of electrons and cations in the cell. Electrolytes include mixtures of materials such as aqueous solutions of metal halide salts (e.g., $ZnBr_2$, $ZnCl_2$, or the like).

As used herein, the term "electrode" refers to an electrical conductor used to make contact with a nonmetallic part of a circuit (e.g., a semiconductor, an electrolyte, or a vacuum). An electrode may also refer to either an anode or a cathode.

As used herein in, the term "anode" refers to the negative electrode from which electrons flow during the discharging phase in the battery. The anode is also the electrode that undergoes chemical oxidation during the discharging phase. However, in secondary, or rechargeable, cells, the anode is the electrode that undergoes chemical reduction during the cell's charging phase. Anodes are formed from electrically conductive or semiconductive materials, e.g., metals (e.g., titanium or TiC coated titanium), metal oxides, metal alloys, metal composites, semiconductors, or the like.

As used herein, the term "cathode" refers to the positive electrode into which electrons flow during the discharging phase in the battery. The cathode is also the electrode that undergoes chemical reduction during the discharging phase. However, in secondary or rechargeable cells, the cathode is the electrode that undergoes chemical oxidation during the cell's charging phase. Cathodes are formed from electrically conductive or semiconductive materials, e.g., metals, metal oxides, metal alloys, metal composites, semiconductors, or the like.

As used herein, the term "bipolar electrode" refers to an electrode that functions as the anode of one cell and the cathode of another cell. For example, in a battery stack, a bipolar electrode functions as an anode in one cell and functions as a cathode in an immediately adjacent cell. In some examples, a bipolar electrode comprises two surfaces, a cathode surface and an anode surface, wherein the two surfaces are connected by a conductive material. For instance, a bipolar electrode plate may have opposing surfaces wherein one surface is the anode surface, the other surface is the cathode surface, and the conductive material is the thickness of the plate between the opposing surfaces.

As used herein, the term "halide" refers to a binary compound of a halogen with another element or radical that is less electronegative (or more electropositive) than the halogen, to make a fluoride, chloride, bromide, iodide, or astatide compound.

As used herein, the term "halogen" refers to any of the elements fluorine, chlorine, bromine, iodine, and astatine, occupying group VIIA (17) of the periodic table. Halogens are reactive nonmetallic elements that form strongly acidic compounds with hydrogen, from which simple salts can be made.

As used herein, "glyme" refers to an ether (e.g., a glycol ether). Examples include, but are not limited to, monoglyme (i.e., 1,2-dimethoxyethane), diglyme (i.e., bis(2-methoxyethyl) ether, tetraglyme (i.e., tetraethylene glycol dimethyl ether), pentaglyme, hexaglyme, heptaglyme, or any combination thereof.

As used herein, a "titanium material" may include, but is not limited to, titanium (in any oxidation state), TiC, alloys of TiC such as $TiC_xM$ (where x is 0, 1, 2, 3, or 4 and M is a metal), titanium carbohyrides, titanium oxycarbides, titanium oxynitrides, titanium oxycarbonitrides, titanium suboxides, non-stoichiometric titanium-carbon compounds, and any combination thereof.

As used herein, "titanium carbide" is used interchangeably with "titanium carbide material" and includes, but is not limited to, TiC, alloys of TiC such as $TiC_xM$ (where x is 0, 1, 2, 3, or 4 and M is a metal), titanium carbohyrides, non-stoichiometric titanium-carbon compounds, and combinations thereof.

As used herein, the term "zinc metal" refers to elemental zinc, also commonly known as Zn(0) or $Zn^0$.

II. Frame Insert

Referring to FIG. 1, a frame insert 2 is shown in a perspective view with horizontal lateral axis X, vertical lateral axis Y, and longitudinal axis Z. The frame insert 2 comprises a plurality of ribs 4 defining a plurality of chambers 6. The ribs 4 are slanted at an angle θ relative to the horizontal lateral axis X. The ribs 4 may have a square or rectangular cross-section. The ribs 4 join to outer member 12 and/or central member 14 via joints, e.g., rounded joints. The majority of the ribs 4 may be uniform in length, cross-section, angle and distance from one another so as to define a plurality of chambers 6 of the same size and shape. At the boundaries of the rib pattern, e.g., where bounded by the outer member 12, the ribs 4 may have a shorter length and may define a chamber 6 with a different (e.g., smaller) size and different shape. The ribs 4 are positioned to reduce performance losses due to stratification by defining chambers 6 with a height that is less than the height of the primary electrolyte chamber. The ribs 4 may be straight across their length. Alternatively, the ribs 4 may be curved across their length. The ribs 4 may be parallel to each other in order to define chambers 6 of consistent height across the length of the chamber. The ribs 4 may be spaced apart by an equal distance to define chambers 6 of equal height to one another. The ribs 4 may have a V-shape or concave shape across their length to promote convective mixing. The V-shaped or concave shaped ribs 4 may be divided by a central member 14.

The outer member 12 of the frame insert 2 surrounds the ribs 4 and is joined to the ribs 4 at outer lateral ends 10 of the ribs 4. The central member 14 extends through the center of the frame insert 2 from a first position on the outer member 12 to a second position on the outer member 12. For example, the central member 14 bisects the outer member 12. The ribs 4 extend between the central member 14 and the outer member 12 and are joined to the central member 14 at central lateral ends 16 of the ribs 4. The outer member 12 has top (12a), bottom (12b), left (12c) and right (12d) sections that form a rectangle or square, e.g., with rounded corners. In the example shown, the central member 14 bisects the outer member 12 extending from the top 12a to the bottom 12b. The outer member 12 and/or central member 14 may have a square or rectangular cross-section. The ribs 4 may extend at an angle upwards and to the right on one side of the central member 14 (e.g., toward the right section 12d of the outer member 12 relative to the view of FIG. 1) and upwards and to the left on the other side of the central member 14 (e.g., toward the left section 12c of the outer member 12 relative to the view of FIG. 1). Alternatively, the central member 14 may be absent and the ribs 4 may extend in a V-shape or concave shape across the frame insert 2.

The plurality of ribs 4, outer member 12, and central member 14 cooperate to define the plurality of chambers 6. The plurality of chambers 6 have a height, h, that is less than the height of the primary electrolyte chamber that receives the frame insert 2. The reduced height, h, of the chambers 6 reduces stratification of the electrolyte, as more dense species (i.e., salts) within the electrolyte are restricted from settling at the bottom of the primary electrolyte chamber by the ribs 4. FIG. 1 shows the ribs 4 slanted at an angle θ relative to the horizontal lateral axis X. The ribs 4 promote convection of electrolyte within the chambers 6. The chambers 6 may define a parallelogrammatic or trapezoidal cross-sectional shape. In some examples, chambers 6 at the top and bottom of the frame insert 2 (e.g., at the top and bottom sections 12a, 12b of the outer member 12 relative to the view of FIG. 1) may have a different shape (e.g., triangular) to allow the outer member 12 to restrict the boundaries of the chambers 6 (e.g., where the top section 12a or bottom section 12b of the outer member 12 defines a portion of the boundary of the chambers 6). The chambers 6 may have rounded corners 18 where the joint between the ribs 4 and the outer member 12 is rounded and/or the joint between the ribs 4 and the central member 14 is rounded.

The plurality of ribs 4 define a plurality of voids 8. Each void 8 is formed as a slot on a longitudinal-facing face 4a (e.g., front face) of each rib 4. The voids 8 are staggered in their position along the lateral length of the ribs 4. The voids 8 (e.g., slots) of the frame insert 2 allow gas to travel between the chambers 6 and allow gas within the electrolyte to escape the frame insert 2 and exit the battery to reduce pressure build-up within the battery. The chambers 6 near the top of the frame insert 2 (e.g., near the top section 12a of the outer member 12 relative to the view of FIG. 1) may contain a head space above the electrolyte to which gas may exit the electrolyte and then exit the frame and battery, e.g., through a pressure relief valve. The voids 8 may be positioned adjacent or near the outer lateral ends 10 of the ribs 4 and adjacent to or near the outer member 12 (e.g., adjacent or near the left and right sections 12c, 12d of the outer member 12 relative to the view of FIG. 1). The voids 8 may be staggered along a lateral length of the ribs 4 extending from the central member 14 toward a corresponding one of the left section 12c of the outer member 12 or the right section 12d of the outer member 12. Each void 8 may be defined by a rectangular-shaped recess formed in the front face 4a of the corresponding rib 4. When installed in a battery, the voids 8 may be adjacent to the anode of the battery, i.e., formed in the ribs 4 on the anode side of the frame insert 2. The frame insert 2 may be manufactured by injection molding or other suitable means and may be made out of plastic or another suitable material.

III. Battery

A) Frame

Figure 2:
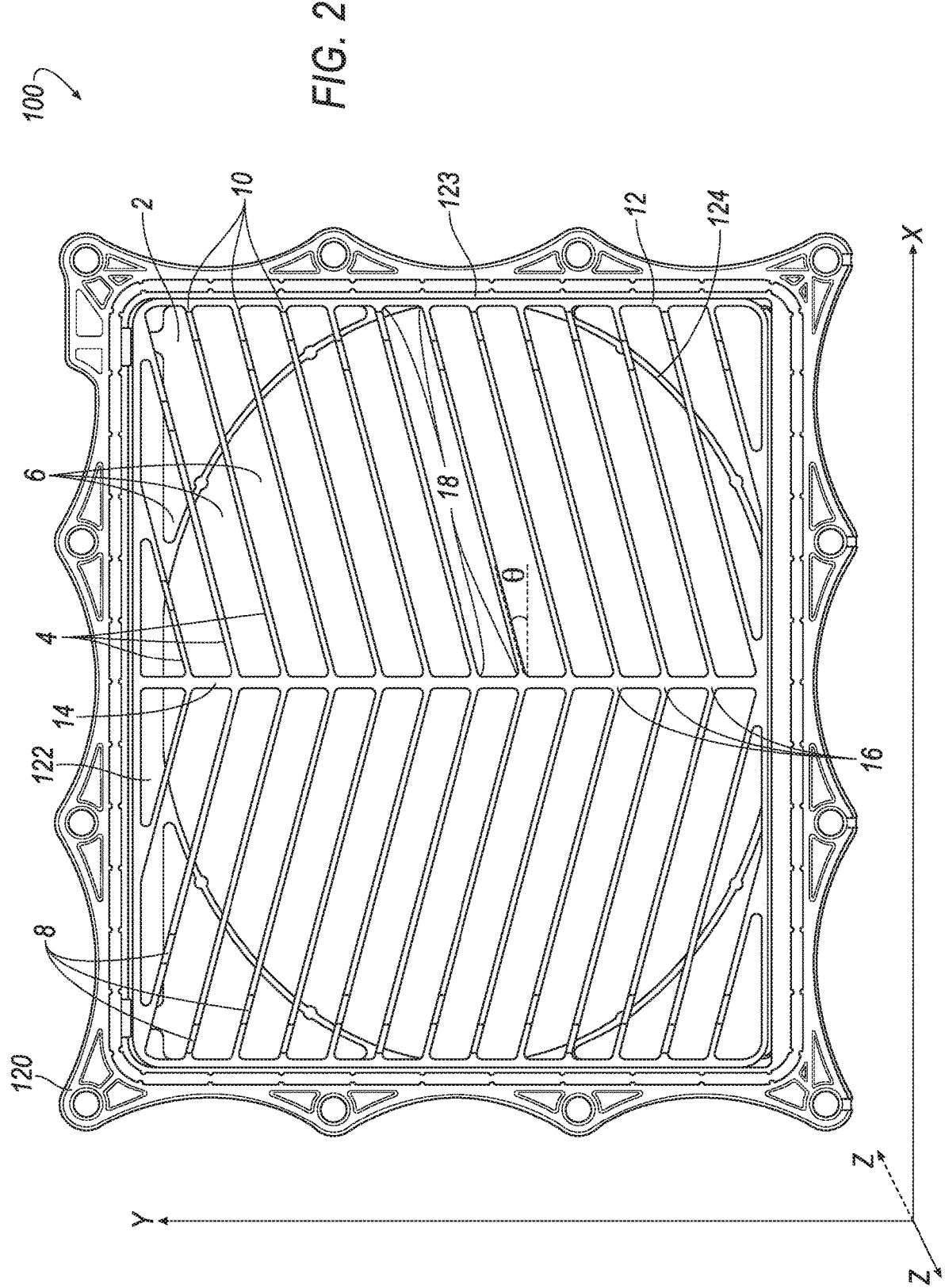
FIG. 2 is a front view of the frame insert of FIG. 1 inserted into a battery frame.

Referring to FIG. 2, a front view of an assembly 100 with the frame insert 2 inserted within a frame 120. The frame insert 2 is longitudinally supported by an inner frame flange 122 and laterally supported by an inner frame edge 123. An inner frame member 124 may also provide additional longitudinal support for the frame insert 2, e.g., with an electrode (not shown) located between the frame insert 2 and the inner frame member 124. The frame 120 may also support an anode, a cathode and an electrolyte of a battery. The frame 120 may be a frame as described in application No. 62/549,667, filed Aug. 24, 2017, the entire contents of which are incorporated herein by reference.

Figure 3:
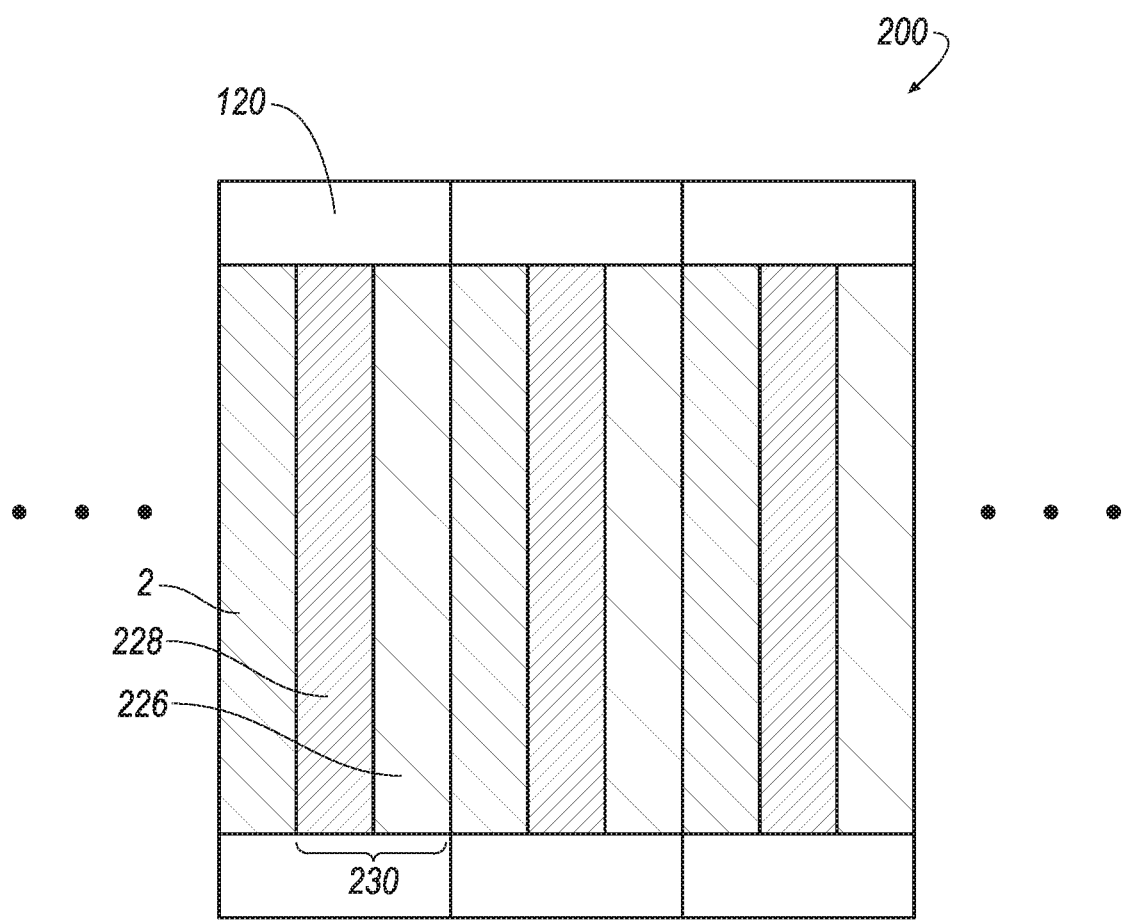
FIG. 3 is a cross-sectional diagram of a battery with an anode, cathode, frame, and frame insert.

Referring to FIG. 3, a cross-sectional diagram of a rechargeable battery 200 with multiple cells, each cell having a frame 120, anode 226, cathode 228, and a frame insert 2. The anode 226 and cathode 228 form a bipolar electrode 230. The insert 2 is located (i.e., sandwiched) between adjacent bipolar electrodes 230. The insert 2, the anode 226, and the cathode 228 of each cell are surrounded by and supported by a corresponding frame 120. Thus, each frame 120 holds a corresponding frame insert 2 and a corresponding bipolar electrode 230. Electrolyte is present within chambers 6 (see FIGS. 1 and 2) of the insert 2. The frame 120 may comprise a pressure release valve and/or electrolyte fill hole. The voids 8 (see FIGS. 1 and 2) are formed in the insert 2 on the side of the insert 2 that is adjacent to the anode 226. Adjacent frames 120 may be sealed together to prevent leaking of electrolyte, e.g., with an O-ring.

B) Electrolyte

The electrolyte is a zinc halide electrolyte. For example, the electrolyte may be an aqueous or non-aqueous (e.g., deep eutectic) zinc-halide electrolyte.

Any suitable zinc halide electrolyte may be used within the scope of the invention. For example, electrolytes described in PCT Publication No. WO 2016/057477, filed Oct. 6, 2015, US Publication No. 2017/0194666, filed Mar. 29, 2016, and PCT Application No. PCT/US2017/033028, filed May 17, 2017, all of which are incorporated herein by reference, may be used within the scope of the invention. In a zinc-halide battery, zinc bromide, zinc chloride, or any combination of the two, present in the electrolyte, act as the electrochemically active material.

The electrolyte for use in a secondary zinc bromine electrochemical cell may comprise from about 30 wt % to about 40 wt % of $ZnCl_2$ or $ZnBr_2$; from about 5 wt % to about 15 wt % of KBr; from about 5 wt % to about 15 wt % of KCl; and one or more quaternary ammonium agents, wherein the electrolyte comprises from about 0.5 wt % to about 10 wt % of the one or more quaternary ammonium agents.

In some embodiments, the electrolyte comprises from about 4 wt % to about 12 wt % (e.g., from about 6 wt % to about 10 wt %) of potassium bromide (KBr). In some embodiments, the electrolyte comprises from about 8 wt % to about 12 wt % of potassium bromide (KBr).

In some embodiments, the electrolyte comprises from about 4 wt % to about 12 wt % (e.g., from about 6 wt % to about 10 wt %) of potassium chloride (KCl). In some embodiments, the electrolyte comprises from about 8 wt % to about 14 wt % of potassium chloride (KCl). In some embodiments, the electrolyte comprises from about 11 wt % to about 14 wt % of potassium chloride (KCl).

In some embodiments, the aqueous electrolyte comprises from about 25 wt % to about 70 wt % of $ZnBr_2$; from about 5 wt % to about 50 wt % of water; and from about 0.05 wt % to about 10 wt % of one or more quaternary ammonium agents.

In some embodiments, the aqueous electrolyte comprises from about 25 wt % to about 40 wt % of $ZnBr_2$; from about 25 wt % to about 50 wt % water; from about 5 wt % to about 15 wt % of KBr; from about 5 wt % to about 15 wt % of KCl; and from about 0.5 wt % to about 10 wt % of the one or more quaternary ammonium agents.

In some embodiments, the one or more quaternary ammonium agents comprises a quaternary agent selected from the group consisting of ammonium chloride, tetraethylammonium bromide, tetraethylammonium chloride, trimethylpropylammonium bromide, triethylmethyl ammonium chloride, trimethylpropylammonium chloride, butyltrimethylammonium chloride, trimethylethyl ammonium chloride, N-methyl-N-ethylmorpholinium bromide, N-methyl-N-ethylmorpholinium bromide (MEMBr), 1-ethyl-1-methylmorpholinium bromide, N-methyl-N-butylmorpholinium bromide, N-methyl-N-ethylpyrrolidinium bromide, N,N,N-triethyl-N-propylammonium bromide, N-ethyl-N-propylpyrrolidinium bromide, N-propyl-N-butylpyrrolidinium bromide, N-methyl-N-butylpyrrolidinium bromide, 1-methyl-1-butylpyrrolidinium bromide, N-ethyl-N-(2-chloroethyl)pyrrolidinium bromide, N-methyl-N-hexylpyrrolidinium bromide, N-methyl-N-pentylpyrrolidinium bromide, N-ethyl-N-pentylpyrrolidinium bromide, N-ethyl-N-butylpyrrolidinium bromide, trimethylene-bis(N-methylpyrrolidinium) dibromide, N-butyl-N-pentylpyrrolidinium bromide, N-methyl-N-propylpyrrolidinium bromide, N-propyl-N-pentylpyrrolidinium bromide, 1-ethyl-4-methylpyridinium bromide, 1-ethyl-2-methylpyridinium bromide, 1-butyl-3-methylpyridinium bromide, cetyltrimethylammonium bromide, cetyltrimethylammonium chloride, cetyltriethylammonium bromide, and any combination thereof.

In some embodiments, the one or more quaternary ammonium agents comprises an alkyl substituted pyridinium chloride, an alkyl substituted pyridinium bromide, an alkyl substituted morpholinium chloride, an alkyl substituted morpholinium bromide, an alkyl substituted pyrrolidinium chloride, an alkyl substituted pyrrolidinium bromide, or any combination thereof.

In some embodiments, the electrolyte comprises one or more additional components such as a glyme (e.g., monoglyme, diglyme, triglyme, tetraglyme, pentaglyme, hexaglyme, or any combination thereof), an ether (e.g., DME-PEG, dimethyl ether, or a combination thereof), an alcohol (e.g., methanol, ethanol, 1-propanol, isopropanol, 1-butanol, sec-butanol, iso-butanol, tert-butanol, or any combination thereof), a glycol (e.g., ethylene glycol, propylene glycol, 1,3-butylene glycol, 1,4-butylene glycol, neopentyl glycol, hexalene glycol, or any combination thereof), an additive (e.g., Sn, In, Ga, Al, Tl, Bi, Pb, Sb, Ag, Mn, Fe, or any combination thereof), an acid (e.g., acetic acid, nitric acid, citric acid, or any combination thereof), potassium dihydrogen citrate, a crown ether (e.g. 18-crown-6, 15-crown-5, or a combination thereof), citric acid monohydrate, or potassium dihydrogen citrate monohydrate.

In one embodiment, the electrolyte consists of zinc bromide, 27.42 wt %; water, 44.34 wt %; potassium bromide, 6.78 wt %; potassium chloride, 9.83%; 2,5,8,11, 14-pentaoxapentadecane, 2.58 wt %; 4-ethyl-4-methylmorpholin-4-ium bromide, 1.03 wt %; tetraethylammonium bromide, 2.03 wt %; triethylmethylammonium chloride, 1.94 wt %; methoxypolyethylene glycol MW 2000, 1.29 wt %; methoxypolyethylene glycol MW 1000, 0.32 wt %; 2,2-dimethyl-1,3-propanediol, 1.29 wt %; 2-methylpropan-2-ol, 0.32 wt %; hexadecyltrimethylammonium bromide, 0.06 wt %; hydrobromic acid (to reach a pH of 3.6), 0.52 wt %; 1,1-dioctadecyl-4,4' bipyridinium dibromide, 0.25 wt %; tin chloride, 7 ppm; and indium chloride, 7 ppm.

In one embodiment, the electrolyte consists of zinc bromide, 35.41 wt %; water, 38.84 wt %; potassium bromide, 5.54 wt %; potassium chloride, 11.09 wt %; triethylmethylammonium chloride, 5.8 wt %; polyethyleneglycol dimethyl ether (MW 2000), 1.26 wt %; polyethyleneglycol dimethyl ether (MW 1000), 0.35 wt %; 2,2-dimethylpropane-1,3-diol, 1 wt %; polydimethylsiloxane trimethylsiloxy terminated (MW 1250), 0.2 wt %; indium chloride, 7 ppm; and tin chloride, 7 ppm.

Other aqueous dissolved salt electrolyte species may be used within the scope of the invention. For example, electrolyte C) Electrodes Rechargeable batteries of the present invention comprise an anode and a cathode. The electrodes may be bipolar electrodes with an anode on the front surface and a cathode on the back surface of a bipolar electrode plate. The bipolar electrode plate comprises a conductive material that is relatively inert to zinc halide electrolyte used in the battery. In some embodiments, the bipolar electrode plate comprises a titanium material (e.g., titanium or titanium oxide). In some instances, the bipolar electrode plate further comprises a coating or film that covers at least a portion of the front (anode) and/or back (cathode) surfaces. In some embodiments, the electrode plate comprises a titanium material coated with a titanium carbide material. In some embodiments, the bipolar electrode plate comprises an electrically conductive carbon felt, e.g. a loaded carbon felt such as those described in U.S. provisional application No. 62/427,983, filed Nov. 30, 2016, the entire contents of which are incorporated herein by reference. In some embodiments the bipolar electrode is a bipolar electrode having a cathode assembly comprising a carbon material a separator and a cathode cage, such as those described in PCT Publication No. WO 2016/057457, filed Oct. 6, 2015, the entire contents of which are incorporated herein by reference.

IV. Examples

Zinc-halide battery stacks were assembled with a chambered frame insert according to the present invention. Control batteries were assembled without a frame insert. Each of the battery stacks (test battery stacks with and without the chambered frame insert) were assembled using a titanium carbide bipolar electrode plate and a titanium carbide anode terminal plate. Soft graphite felt (G250 AvCarb®) was adhesively bonded to the cathode surface or face of the bipolar electrode plate using graphite filled PVDF/methacrylate adhesive from Astro Chemicals, which was applied as a substantially uniform coating over the portion of the cathode surface that was covered by the graphite felt. A titanium carbide current collector having an open box configuration was laser welded to cover the central region of the exterior surface of the anode terminal plate, and a CP2 grade titanium stem was impact welded to the center of this current collector to provide the anode battery stack terminal. A titanium carbide current collector having an open box configuration was laser welded to cover the central region of the exterior surface (opposite of the cathode surface) of the bipolar electrode plate in the battery stack, and a CP2 grade titanium stem was impact welded to the center of this current collector to provide the cathode battery stack terminal. The bipolar electrode plate and the terminal anode plate were placed in PVC frames (with and without chambered frame inserts), and the PVC frames were bolted together under compression between metal (steel) endplates using tie rods, washers, and nuts to provide a dry battery stack. Each of the metal endplates included through holes adapted to provide access to the terminal stems that protruded from these holes and to leave the open-box anode and cathode current collectors in an uncompressed state.

Each of the dry battery stacks was filled with 1.06 L of electrolyte formulated according to the ingredients and concentrations set forth in Table 1.

TABLE 1

Electrolyte formulation for battery stacks.

| Ingredient: | Amount (wt %): |
|---|---|
| Zinc bromide (ZnBr$_2$) | 40.89 |
| Distilled H$_2$O | 35.64 |
| Potassium Bromide (KBr) | 4.95 |
| Potassium Chloride (KCl) | 10.01 |
| Triethylmethylammonium Chloride | 5.25 |
| Tetraethylammonium Bromide (TEA) | 0.99 |
| DME PEG 2000 (Ave. M$_n$~2000) | 1.14 |
| DME PEG 1000 (Ave. M$_n$~1000) | 0.32 |
| Neopentyl Glycol | 0.9 |
| Indium Chloride | 7 ppm |
| Tin Chloride | 7 ppm |

The chambered and control battery stacks were charged at a constant power rate of either 19.69 W (75% milestone) or 26.25 W (100% milestone) to a capacity of either 78.75 Wh (75% milestone) or 105 Wh (100% milestone) and a maximum potential of 2 V, followed by discharging down to 1V at the same rate.

Figure 4:
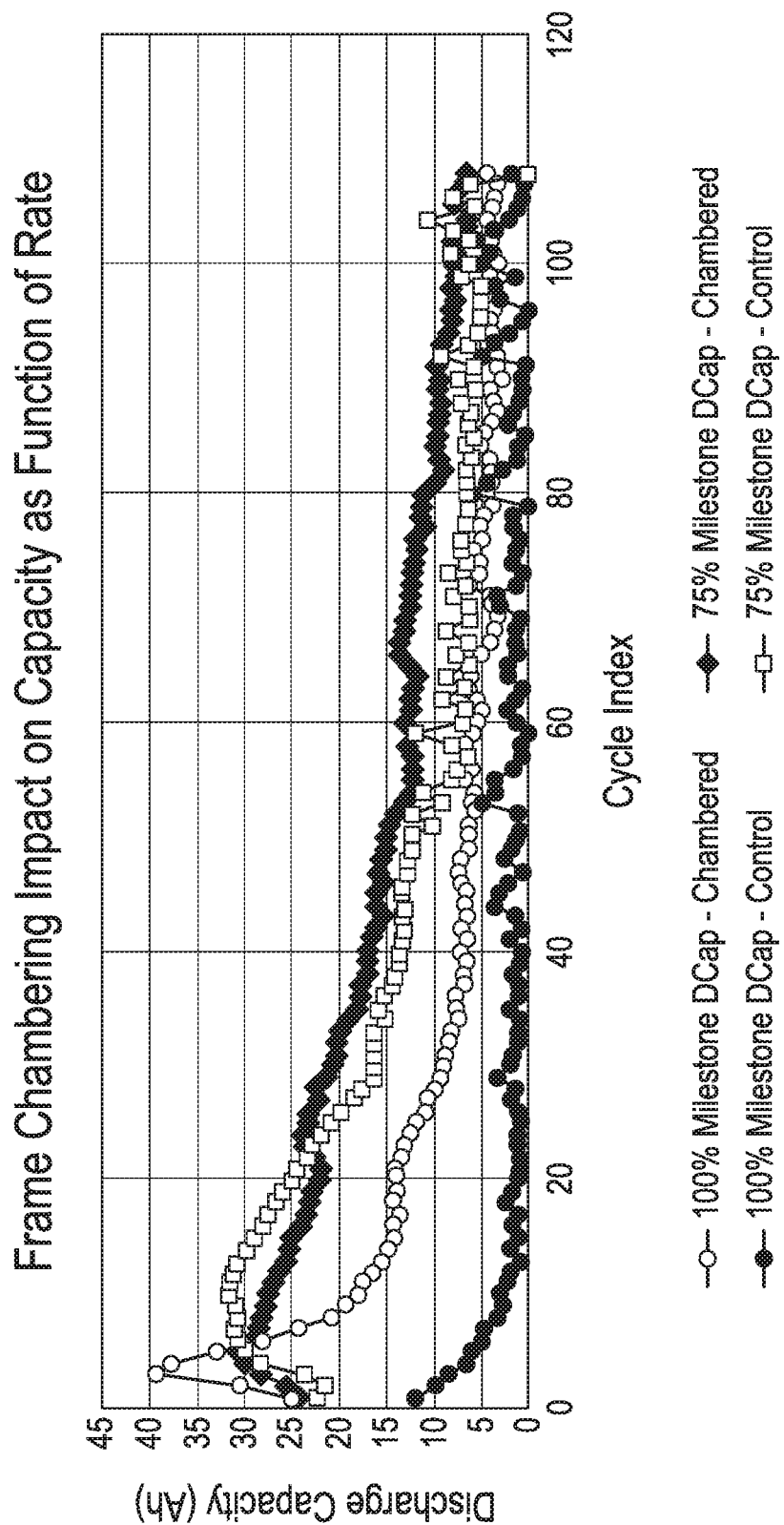
FIG. 4 is a plot showing discharge capacity as a function of cycle index for zinc-halide cells with and without a frame insert at 100% and 75% of maximum ("milestone") rates.
Figure 5:
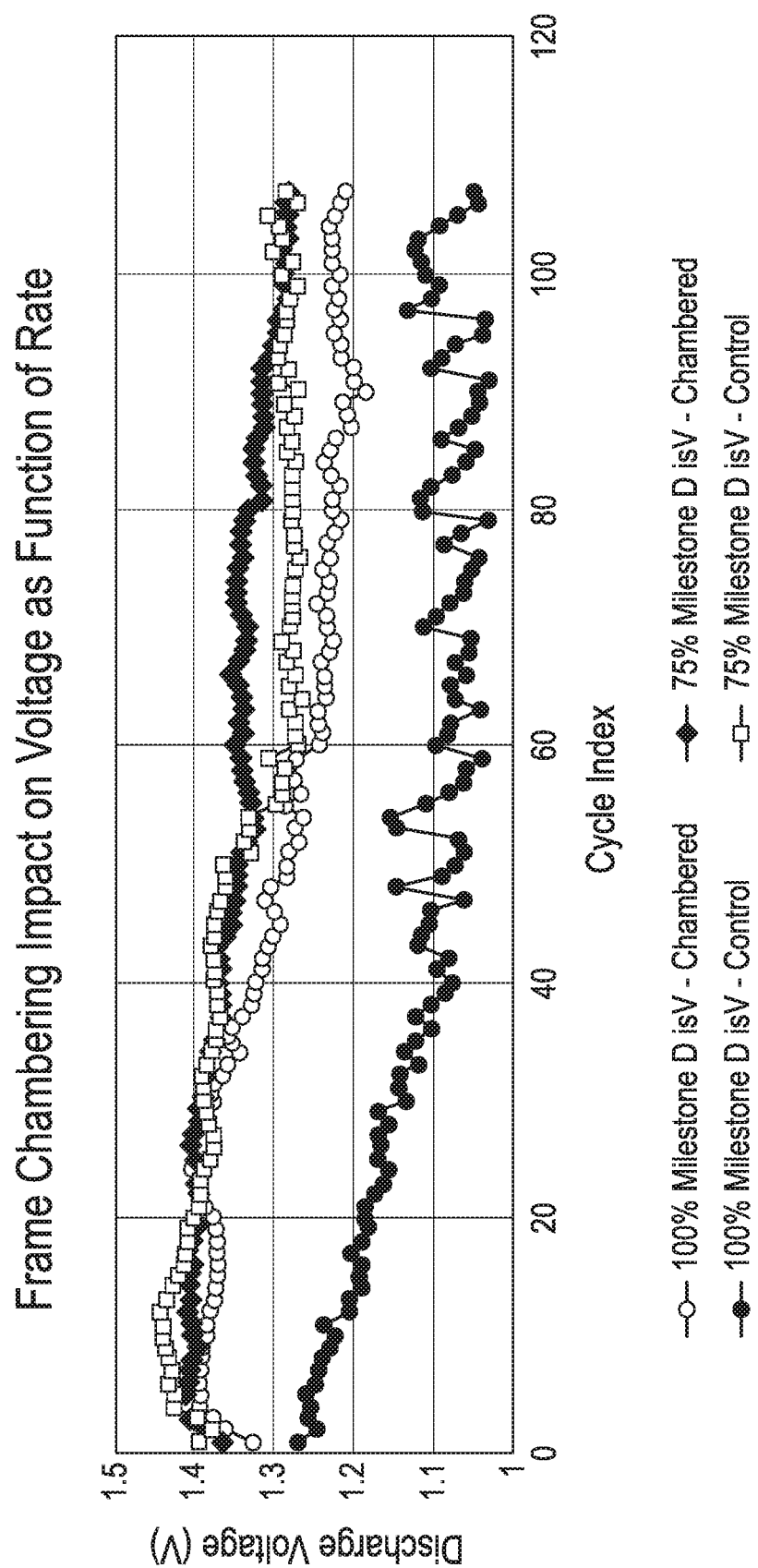
FIG. 5 is a plot showing average cell discharge voltage as a function of cycle index for zinc-halide cells with and without a frame insert at 100% and 75% of maximum ("milestone") rates.

Referring to FIG. 4, a plot shows discharge capacity as a function of cycle index for zinc-halide cells with and without a frame insert at 100% and 75% of maximum ("milestone") rates. The plot of FIG. 4 shows the discharge capacity improving significantly for zinc-halide static cells incorporating chambered frame inserts 2, as discussed above with reference to FIGS. 1-3. The improvement from adding a chambered frame insert is particularly large at higher cell capacities and rates ("100% Milestone") as compared to lower cell capacities and rates ("75% Milestone"). The cell voltage also improves significantly, as seen in a plot of FIG. 5 showing discharge voltage as a function of cycle index for zinc-halide cells with and without a frame insert at 100% and 75% of maximum ("milestone") rates.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A frame insert for an electrolyte chamber of an aqueous battery using a dissolved salt, the frame insert comprising:
   a plurality of ribs extending laterally and defining a plurality of chambers, wherein the plurality of ribs are angled with respect to a horizontal lateral axis of the frame insert;
   a plurality of voids, wherein each of the plurality of voids is formed in a single corresponding rib and configured to allow gas to travel between the plurality of chambers;
   an outer member surrounding the plurality of ribs and joined to the plurality of ribs at an outer lateral end of the plurality of ribs; and
   a central member extending along a vertical lateral axis through the center of the frame insert within the outer member and joined to the outer member.

2. The frame insert of claim 1, wherein the plurality of voids comprise a plurality of slots.

3. The frame insert of claim 1, wherein the plurality of voids are laterally staggered across the plurality of ribs.

4. The frame insert of claim 1, wherein each of the plurality of voids are formed in a longitudinal face of the single corresponding rib.

5. The frame insert of claim 1, wherein the plurality of voids are near or adjacent to upward most lateral ends of the plurality of ribs.

6. The frame insert of claim 1, wherein a majority of the plurality of ribs extend from the central member to the outer member.

7. The frame insert of claim 6, wherein the outer member laterally surrounds the plurality of ribs and is joined to the plurality of ribs at the outer lateral end of the ribs, and wherein the central member extends from a first position of the outer member to a second position of the outer member and the central member is joined to a majority of the plurality of ribs at an inner lateral end of the ribs.

8. The frame insert of claim 7, wherein joints between the plurality of ribs and the outer member and joints between the plurality of ribs and the central member are rounded, such that the plurality of chambers defined by the plurality of ribs, the outer member, and the central member have rounded corners.

9. The frame insert of claim 7, wherein a majority of the plurality of chambers defined by the plurality of ribs, the outer member, and the central member have a cross-sectional shape that is substantially parallelogrammatic or trapezoidal.

10. The frame insert of claim 7, wherein each of the plurality of ribs comprise a length that extends from the central member to the outer member at an angle ($\theta$) relative to the horizontal lateral axis.

11. The frame insert of claim 1, wherein a majority of the plurality of chambers have a uniform height across their length.

12. The frame insert of claim 11, wherein the majority of the plurality of chambers comprise a same height.

13. The frame insert of claim 1, wherein the aqueous battery is an aqueous zinc halide battery.

14. An aqueous battery using a dissolved salt comprising:
   an anode;
   a cathode;
   an electrolyte, wherein the electrolyte is an aqueous dissolved salt;
   a frame; and
   a frame insert, wherein the frame insert comprises:
      a plurality of ribs extending laterally and defining a plurality of chambers, the plurality of ribs are angled with respect to a horizontal lateral axis of the frame insert;
      an outer member surrounding the plurality of ribs and joined to the plurality of ribs at an outer lateral end of the plurality of ribs; and
      a central member extending along a vertical axis through the center of the frame insert within the center of the outer member and joined to the outer member,
   wherein the electrolyte at least partially fills the plurality of chambers of the frame insert.

15. The aqueous battery of claim 14, wherein the electrolyte is a zinc halide electrolyte.

16. The aqueous battery of claim 14, wherein the frame insert is laterally supported by the frame.

17. The aqueous battery of claim 14, wherein the frame insert is longitudinally supported by one or more of the cathode, the anode, and the frame.

18. The aqueous battery of claim 14, further comprising a plurality of voids formed in the plurality of ribs and configured to allow gas to travel between the plurality of chambers.

19. The aqueous battery of claim 18, wherein each of the plurality of voids is formed in a front face of a single corresponding rib, and wherein the front face is adjacent to the anode.

20. The aqueous battery of claim 14, wherein the electrolyte fully fills the plurality of chambers except for a head space at the uppermost chamber or chambers.

21. The aqueous battery of claim 14, wherein the aqueous battery is an aqueous zinc halide battery.

* * * * *